US012322279B2

(12) United States Patent
Schmidt

(10) Patent No.: US 12,322,279 B2
(45) Date of Patent: Jun. 3, 2025

(54) REMOTE SWITCH AND METHOD FOR COMMUNICATION WITH A REMOTE SWITCH

(71) Applicant: EnOcean GmbH, Oberhaching (DE)

(72) Inventor: Frank Schmidt, Munich (DE)

(73) Assignee: EnOcean GmbH, Oberhaching (DE)

( * ) Notice: Subject to any disclaimer, the term of this patent is extended or adjusted under 35 U.S.C. 154(b) by 0 days.

(21) Appl. No.: 17/642,372

(22) PCT Filed: Sep. 10, 2020

(86) PCT No.: PCT/EP2020/075369
§ 371 (c)(1),
(2) Date: Mar. 11, 2022

(87) PCT Pub. No.: WO2021/052863
PCT Pub. Date: Mar. 25, 2021

(65) Prior Publication Data
US 2022/0327915 A1 Oct. 13, 2022

(30) Foreign Application Priority Data
Sep. 16, 2019 (DE) ......................... 102019124834.5

(51) Int. Cl.
*G08C 17/02* (2006.01)

(52) U.S. Cl.
CPC ........ *G08C 17/02* (2013.01); *G08C 2201/112* (2013.01); *G08C 2201/21* (2013.01); *G08C 2201/93* (2013.01)

(58) Field of Classification Search
CPC .............. G08C 17/02; G08C 2201/112; G08C 2201/11; G08C 2201/50; H05B 47/19
See application file for complete search history.

(56) References Cited

U.S. PATENT DOCUMENTS 9,820,361 B1 11/2017 Turvy, Jr. et al.
2011/0287757 A1 11/2011 Nykoluk
(Continued)

FOREIGN PATENT DOCUMENTS

CN 106406258 A 2/2017
CN 106534180 A 3/2017
(Continued)

OTHER PUBLICATIONS

International Search Report and Written Opinion of International Searching Authority corresponding to International Patent Application No. PCT/EP2020/075369, with English translation of the Search Report, mailed Oct. 26, 2020 (10 pages).
(Continued)

*Primary Examiner* — Vernal U Brown
(74) *Attorney, Agent, or Firm* — Nixon Peabody LLP

(57) ABSTRACT

A remote switch including a first wireless interface for sending switch commands. The remote switch has a second wireless interface arranged separate from the first. The second wireless interface is configured for the wireless transmission of information between the remote switch and an external device. A method for communication between a remote switch and an external device is also disclosed. The method involves creating a communication link between a wireless interface of the remote switch and a wireless interface of the external device and transmitting information between the remote switch and the external device by the established communication link. This allows for simple configuration or maintenance of the remote switch by the external device according to the exchanged information.

15 Claims, 5 Drawing Sheets

(56) References Cited

U.S. PATENT DOCUMENTS

Figure 1:
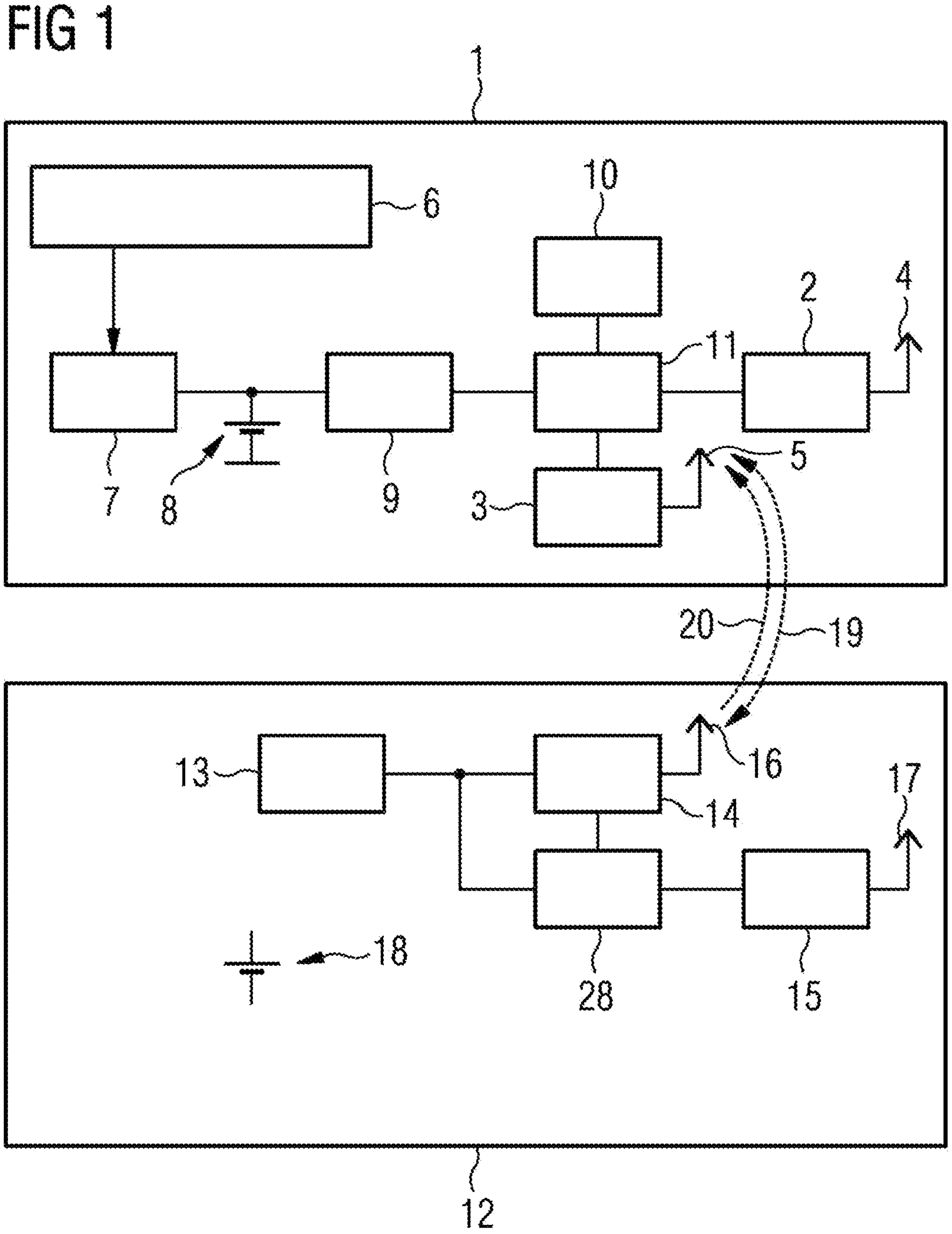

| | | | | |
|---|---|---|---|---|
| 2014/0321294 | A1* | 10/2014 | Nagel | H04L 43/08 370/252 |
| 2015/0044966 | A1 | 2/2015 | Shultz | |
| 2016/0212831 | A1 | 7/2016 | Dobai | |
| 2016/0299675 | A1* | 10/2016 | Winde | A47L 15/0063 |
| 2017/0006694 | A1 | 1/2017 | Davis | |
| 2017/0105176 | A1 | 4/2017 | Finnegan | |
| 2018/0368237 | A1 | 12/2018 | Gal | |
| 2019/0020290 | A1* | 1/2019 | Feng | H02N 2/188 |
| 2019/0074676 | A1 | 3/2019 | Beghelli | |
| 2019/0277529 | A1 | 9/2019 | Madonna | |
| 2022/0327915 | A1 | 10/2022 | Schmidt | |

FOREIGN PATENT DOCUMENTS

| | | | |
|---|---|---|---|
| CN | 106465514 | A | 7/2017 |
| CN | 109315051 | A | 2/2019 |
| CN | 109479017 | A | 3/2019 |
| DE | 202013101796 | | 7/2014 |
| JP | 2002-095067 | A | 3/2002 |
| JP | 2011-101524 | A | 5/2011 |
| WO | 2007135598 | A1 | 11/2007 |
| WO | WO 2017/218300 | A1 | 12/2017 |

OTHER PUBLICATIONS

Examination Report in related Japanese Patent Application No. 2022-516407, in Japanese, dated Jul. 4, 2023 (4 pages).

Examination Report in related Korean Patent Application No. 10-2022-7012592, in Korean, dated Aug. 16, 2023 (5 pages).

Examination Report in related Chinese Patent Application No. 202080077706.1, in Chinese, dated Aug. 29, 2023 (9 pages).

Examination Report in related Japanese Patent Application No. 2022-516407, in Japanese, dated Mar. 5, 2024 (2 pages).

Examination Report in related Chinese Patent Application No. 202080077706.1, in Chinese, dated Jul. 24, 2024 (5 pages).

Examination Report in related Japanese Patent Application No. 2022-516407, in Japanese, dated Aug. 30, 2024 (3 pages).

Examination Report in related Korean Patent Application No. 10-2022-7012592, in Korean, dated Jul. 26, 2024 (4 pages).

Examination Report in related European Patent Application No. 20772246.3, dated Dec. 5, 2024, in German (6 pages).

* cited by examiner

REMOTE SWITCH AND METHOD FOR COMMUNICATION WITH A REMOTE SWITCH

CROSS-REFERENCE TO RELATED APPLICATIONS

This application is a U.S. National Stage of International Application No. PCT/EP2020/075369, filed Sep. 10, 2020, which claims the benefit of German Patent Application No. 102019124834.5, filed Sep. 16, 2019, both of which are incorporated herein by reference in their entireties.

The invention relates to a remote switch. Furthermore the invention relates to a method for communication with a remote switch.

Remote switches, after manual actuation by a user and/or mechanical actuation by technical equipment, transmit commands by radio over predetermined distances (typically less than 200 meter range inside buildings and less than 20 km range outside buildings) to one or more actuators, devices or systems.

Such remote switches include, in particular, remote switches and other remote controls that are stimulated to send out radio signals by manual operation. Such remote switches are shown, for example, in the publication WO 2004/034560 A2. However, such remote switches also include remote switches that are triggered by mechanical state changes of other devices or systems, e.g., position switches, limit switches, switches with sensor functions on position, weight, presence of objects, etc. Such remote switches are shown, for example, in the publication DE 101 25 059.

The known remote switches, when placed on the market, have a defined range of functions that cannot be modified without significant effort and special technology (e. g. wired reprogramming or hardware modification). A dealer, installer, or end user is typically unable to do this.

Therefore one problem with such remote switches is that a range of functions or various working or operating parameters have so far been defined invariably or can only be changed in a very limited way, e.g. by coding devices on the remote switches themselves, or by means of complex processes. Maintenance of such remote switches has so far also been possible only to a very limited extent, if at all.

It is therefore an object of the present invention to specify a remote switch as well as a method that enables a simpler and more flexible configuration or maintenance of a remote switch.

According to a first aspect, this object is solved by a remote switch as explained below.

Such a remote switch comprises a first wireless interface for sending out switch commands. Further, the remote switch comprises a second wireless interface arranged separately from the first wireless interface. The second wireless interface is configured for wireless transmission of information from an external device to the remote switch and/or from the remote switch to the external device.

Such a remote switch enables easy configuration, maintenance or diagnosis of the functionality of the remote switch or a system comprising such a remote switch and actuators, devices or subsystems controlled thereby by means of an external device that can be coupled to the second wireless interface of the remote switch. Information or data can be easily transmitted from the external device to the remote switch and/or from the remote switch to the external device by means of the second wireless interface of the remote switch.

In this way, a range of functions as well as working or operating parameters of the remote switch can be defined during installation of the remote switch or also subsequently flexibly, simply and extensively changed. Also (subsequent) software updates or software activations can be easily and cheaply performed wirelessly via the second wireless interface. Thus, the remote switch enables simple and flexible configuration or maintenance via the second wireless interface. In this way, the remote switch can also be flexibly adapted to different (possibly changed) operating situations or operating scenarios.

In various embodiments, the remote switch, specifically the second wireless interface is implemented to receive and/or transmit data encrypted from/to the external device. This increases the security of a communication of the remote switch with the external device via the second wireless interface.

In various embodiments, the remote switch is configured to control one or more actuators. Such actuators can be, for example, devices and components of an automated building or home automation system, such as lamps, lights, displays, blinds, shutters, window actuators, electronic access or locking systems, air conditioning systems (in particular so-called “heating, ventilation and air conditioning” systems, HVAC), etc. In various embodiments, the remote switch is configured to be mobile and flexibly positioned.

In various embodiments of the remote switch, the second wireless interface is configured to wirelessly transmit energy from the external device to the remote switch. This has the advantage that energy can be provided to the remote switch via the second wireless interface, which is used to operate the remote switch. This is very useful, for example, during configuration or maintenance by the external device using the second wireless interface. The remote switch itself does not have to provide or expend any energy for this purpose. This is particularly advantageous for so-called energy-autonomous remote switches with very limited energy reserves. Configuration or maintenance can be easily performed with such remote switches despite very limited energy reserves because the energy required for this is provided via the second wireless interface.

In various embodiments of the remote switch, operating the remote switch means, for example, that the remote switch is configured to be operated in an active operating state via energy transmitted from the external device to the remote switch.

In various embodiments of the remote switch, the second wireless interface is configured as a bidirectional data interface for wirelessly exchanging information between the remote switch and the external device.

For example, the remote switch is configured via the bidirectional data interface to transmit a response to the external device in response to a request from an external device transmitted to the remote switch. Alternatively or additionally, the remote switch is configured via the bidirectional data interface, for example, to transmit a request to the external device and then to receive a response back from the external device. This has the advantage that not only information/data can be transferred from the external device to the remote switch, but also information/data can be read out from the remote switch by the external device. In this way, for example, maintenance data or a history of the reliability of the remote switch can be collected. The bidirectional interface makes it possible to read out such data. Furthermore, reliability or quality of the remote switch during operation (e.g., link quality of a radio connection between the remote switch and one or more actuators) can be exchanged and interrogated bidirectionally in this way.

In various embodiments of the remote switch, the second wireless interface is configured as follows:

- as an inductive interface, in particular for near-field communication (range typically a few centimeters to a few meters) and/or
- as a radio interface and/or
- as an optical interface and/or
- as a capacitive interface and/or
- as an acoustic interface.

For example, the second wireless interface is configured as an inductive interface according to the so-called "Near Field Communication" or "NFC" standard. This enables good and reliable compatibility with external devices that also have a corresponding NFC interface. Alternatively or additionally, the second wireless interface is configured as a radio interface for the wireless exchange of information and/or energy via radio signals (radio frequency, RF). This enables communication even over greater distances. This is advantageous for very exposed locations and/or in industrial environments. Alternatively or additionally, the second wireless interface is configured as an optical interface for wireless exchange of information and/or energy via light. This is advantageous, for example, if interference or disturbance of radio signals must be avoided, e.g., in a laboratory environment or a place of use with highly regulated electromagnetic compatibility (EMC) requirements. Further alternatively or additionally, the second wireless interface is configured as an acoustic interface for wireless exchange of information and/or energy via acoustic signals, e.g. ultrasound.

In various embodiments of the remote switch, the remote switch comprises an energy converter for converting ambient energy, in particular mechanical energy or light energy or thermal energy, into electrical energy for operating the remote switch. The remote switch is thus configured as an energy-autonomous remote switch. The energy converter is set up, for example, to convert a mechanical actuating force for actuating the remote switch into electrical energy. Alternatively or additionally, the energy converter is set up, for example, as a solar cell or Peltier element for converting light energy or thermal energy into electrical energy. In various embodiments, the remote switch further comprises an energy storage device to store the electrical energy provided by the energy converter.

In this way, the remote switch can be installed in locations without direct access to wired infrastructure and advantageously draws the energy required for operation from the immediate environment. This has the advantage of maintenance-free operation (from an energy supply point of view) without battery replacement or battery charging.

Alternatively or in addition to embodiments of the remote switch with an energy converter, battery operation via one or more batteries is also possible.

In various embodiments of the remote switch, the remote switch can be configured or maintained via the second wireless interface such that a range of functions of the remote switch and/or operating parameters of the remote switch are influenced by means of one or more of the following measures: activation, deactivation, readout, modification. In this case, some or all of the functions and/or operating parameters of the remote switch can be activated/stored in the remote switch. These can be selected and/or activated via the external device by means of communication via the second wireless interface. Alternatively, new functions and/or operating parameters that are not yet stored in the remote switch can also be loaded/programmed via the external device by means of communication via the second wireless interface. For this purpose, the remote switch is connected, for example, with devices or controls for enabling or limiting or defining a certain range of functions or also certain working or operating parameters.

For example, an individual option or a combination of the following options can be set or provided:

- predefined working parameters such as radio frequencies, operating modes, communication standards, etc.,
- predefined safety levels,
- enabling of one, several or all predefined functions,
- enabling of one, several or all functions only conditionally or temporarily or permanently,
- programming of new functions, working or operating parameters not previously stored in the remote switch.

The above object is solved according to a second aspect by a method explained below.

Such a method is set up for communication between a remote switch and an external device and comprises the following steps:

- creating or setting up a communication link between a wireless interface of the remote switch and a wireless interface of the external device, the wireless interface of the remote switch being arranged separately from a further wireless interface of the remote switch for sending out switch commands,
- transmitting information from the external device to the remote switch and/or from the remote switch to the external device by means of the established communication link.

By such a method, the same effects or advantages are achieved as explained above in connection with the remote switch according to the first aspect.

In various implementations of the method, information or data is transmitted in encrypted form from the remote switch to the external device or from the external device to the remote switch. This increases the security of a communication of the remote switch with the external device via the wireless interface configured for this purpose. Otherwise, the same effects or advantages are obtained as explained above in connection with the remote switch according to the first aspect.

In various implementations, the method comprises the step of:

- transferring energy from the external device to the remote switch using the wireless interface of the remote switch.

This measure achieves the same effects or benefits as explained in connection with the remote switch according to the first aspect above. This step may also be performed in the method at the beginning (initial) before the further steps explained above, or in parallel with these further steps.

In various implementations, the energy transmitted from the external device to the remote switch is advantageously used to operate the remote switch. Advantageously, the energy is transmitted by the external device during configuration or maintenance of the remote switch.

In various implementations, the method comprises the step of:

- configuring or maintaining the remote switch by means of the external device in dependence on the transmitted information, wherein a range of functions of the remote switch and/or operating parameters of the remote switch are influenced by means of one or more of the following measures: activation, deactivation, readout, modification.

A desired configuration of the remote switch is thereby advantageously stored in the external device. By establishing the communication link and exchanging information between the remote switch and the external device by means of the established communication link, the desired configuration can be set in the remote switch.

In various implementations of the method, a query/exchange between the external device and an online service (server) is provided. This includes, for example, authentication of the external device to the online service to verify appropriate rights of the external device to perform a configuration as explained above and/or to retrieve, pre-set or authorize a desired configuration of the remote switch. A connection between the external device and the online service is advantageously encrypted for security reasons.

In various implementations of the method, the external device is connected to the online service and obtains a release for configuring or maintaining the remote switch at the online service, whereby the configuration or maintenance of the remote switch by the external device can only be performed if the release has been obtained at the online service. By these measures, configuration or maintenance of the remote switch via the external device can only be performed if the configuration or maintenance or its range is enabled (authorized) via the online service.

In various implementations of the method, the online service specifies a range for configuring or maintaining the remote switch, and the range for configuring or maintaining the remote switch in the external device is authorized via the obtained release. For example, the external device first sends a request for configuration or maintenance of the remote switch to the online service. The online service checks the request or a related range of a configuration or maintenance or whether the external device has the corresponding rights. For example, the online service checks, on the basis of a user account, whether certain configurations or settings of the remote switch are activated in advance or have been acquired via a user of the external device. In this case, the online service authorizes the request or a related range of a configuration or maintenance that can then be performed on the remote switch via the external device. If these mechanisms fail, configuration or maintenance of the remote switch via the external device by the online service fails.

In various implementations, the method comprises the step of:

- readout of identification information of the remote switch by the external device, wherein configuring or maintaining the remote switch is performed in response to the read out identification information. This has the advantage that the remote switch is identified for the aforementioned measures and these measures are performed in dependence on such identification. Thus, a safe and error-free configuration or maintenance of the remote switch is ensured.

In various implementations of the method, readout of the identification information of the remote switch is performed by means of the communication link between the wireless interfaces of the remote switch and the external device. Alternatively, readout of the identification information is performed via a separate path, such as by reading a QR code on the remote switch via a sensor (such as a camera) of the external device.

In various implementations of the method, forwarding or checking of the identification information of the remote switch is performed from the external device to an online service (server). This online service may be the online service mentioned above or another online service. A connection for this purpose between the external device and the online service is advantageously encrypted for security reasons.

In various implementations, the method comprises the steps of:

- sending out a radio signal by the remote switch to one or more actuators initiated by the external device by means of the communication link,
- receiving one or more return signals from the one or more actuators by the remote switch
- storing a pairing of the remote switch with the one or more actuators.

These measures allow very simple pairing of the remote switch with one or more actuators, controlled or initiated by the external device communicating with the remote switch via the communication link and the wireless interface configured for this purpose. The sending of the radio signal is performed, for example, via the further separate interface of the remote switch. Storing the pairing is performed, for example, in the remote switch or in the actuator, and as an additional option in the external device.

In various implementations of the method, information is exchanged between the remote switch and the external device bidirectionally via the communication link. This achieves the same effects or advantages as explained above in connection with the remote switch according to the first aspect.

In various implementations, the method comprises the steps of:

- sending out a radio signal by the remote switch to one or more actuators,
- receiving one or more return signals of the one or more actuators by the remote switch,
- transmitting status information dependent on the received return signal(s) from the remote switch to the external device by means of the communication link,
- evaluating the transmitted status information by the external device.

These measures allow testing, configuration, maintenance or modification of an overall system comprising the remote switch and one or more actuators controlled by the remote switch. By means of the established communication link between the external device and the remote switch, a transmission path between the remote switch and one or more actuators can be checked and/or influenced. Thus, not only information/data concerning the remote switch itself, but also information/data concerning the one or more actuators are generated and transmitted back from them to the remote switch (triggered by the radio signal sent by the remote switch). This retransmitted information/data is then transmitted to the external device via the wireless interface of the remote switch configured for this purpose and can be evaluated and analyzed there. In these implementations, sending out radio signals from the remote switch to the one or more actuators is also performed, for example, via the further separate interface of the remote switch.

The above measures also have the advantage that checking of the transmission path between the remote switch and the one or more actuators can be performed without the external device having to be coupled into a radio network (e.g., wireless local area network, WLAN, or Wifi) within which the remote switch communicates with the one or more actuators. Rather, the remote switch is an intermediary between the transmission path of the one or more actuators and the external device, whereby data is passed to the external device via the one or more actuators using the remote switch and the arranged wireless interface. In this manner, checking of the transmission path between the remote switch and the one or more actuators by means of the external device is very easily possible without having to allow an unknown external device access to a private radio network.

Using the measures provided in these implementations, the following further steps are performed in more advanced implementations:

predefining a defined range of functions and/or defined operating parameters by means of the external device, comprising a defined control of one or more actuators by the remote switch, setting the defined range of functions and/or the defined operating parameters in the remote switch, sending out the radio signal by the remote switch to the one or more actuators depending on the defined range of functions and/or the defined operating parameters, storing a pairing of the remote switch with the one or more actuators if the evaluated status information meets predetermined criteria.

By means of these additional measures, it is possible, alternatively or in addition to the above measures, to enable a particularly easy and advantageous assignment (pairing) of components and functions of several devices among each other in the system comprising the remote switch and one or more actuators. This is controlled by the external device by means of the communication link established to the remote switch. This is particularly useful during installation of the remote switch, but also during maintenance and troubleshooting of the system.

The above object is solved according to a third aspect by an arrangement comprising a remote switch and an external device according to the present disclosure. In particular, the arrangement is configured to perform a method according to the second aspect. In various embodiments of the arrangement, the remote switch is advantageously set up as the remote switch according to the first aspect. The external device is set up to communicate with the remote switch.

The external device discussed herein is, for example, a smartphone, tablet device, or a smartwatch.

Any structural features, aspects, advantages and effects of the remote switch according to the first aspect are reflected in method features, aspects, advantages and effects of the method according to the second aspect, and vice versa. The same applies between the arrangement according to the third aspect and the method according to the second aspect.

The invention is explained in more detail below with reference to embodiments with the aid of several drawings.

Figure 2:
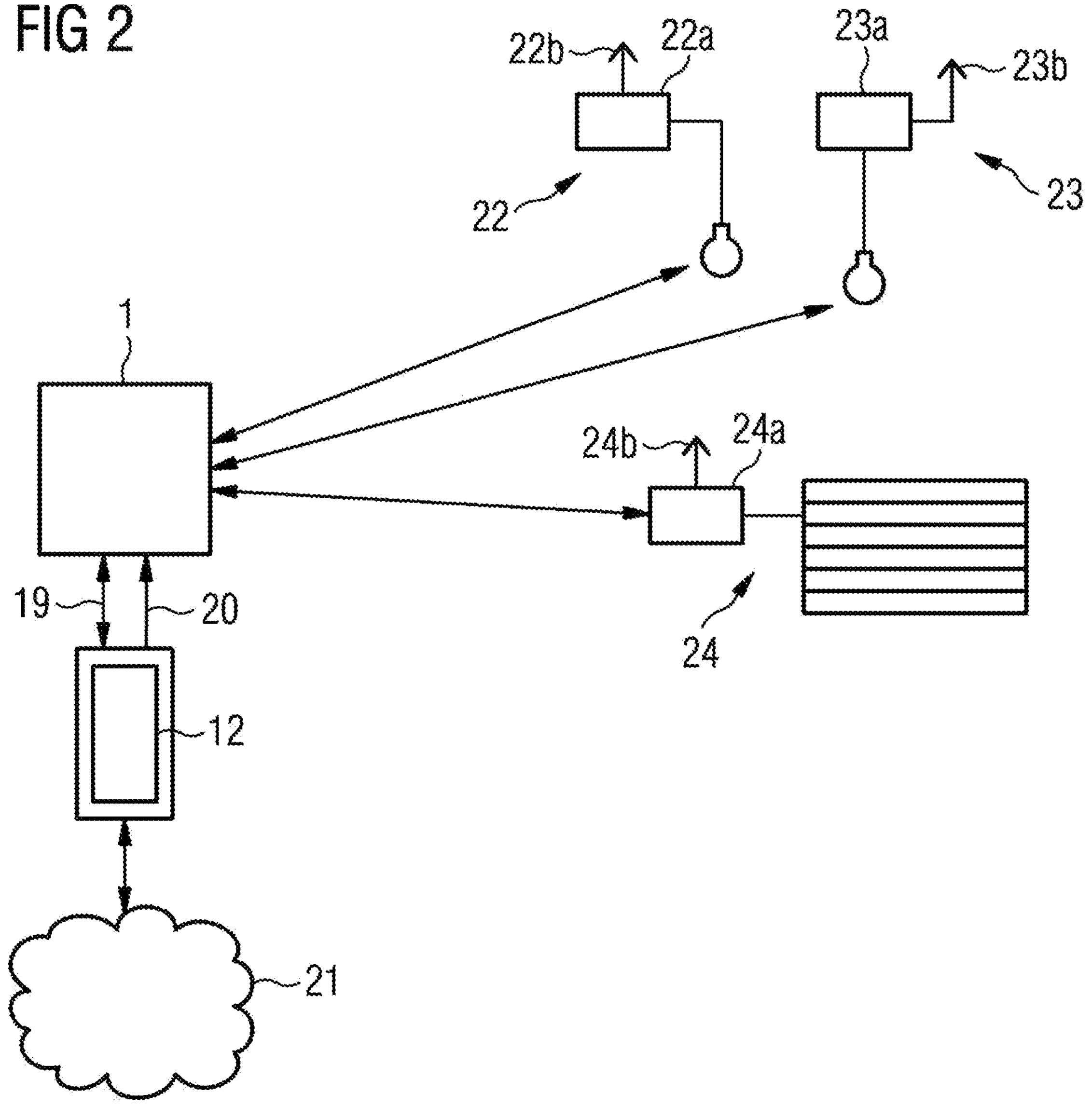
Figure 3:
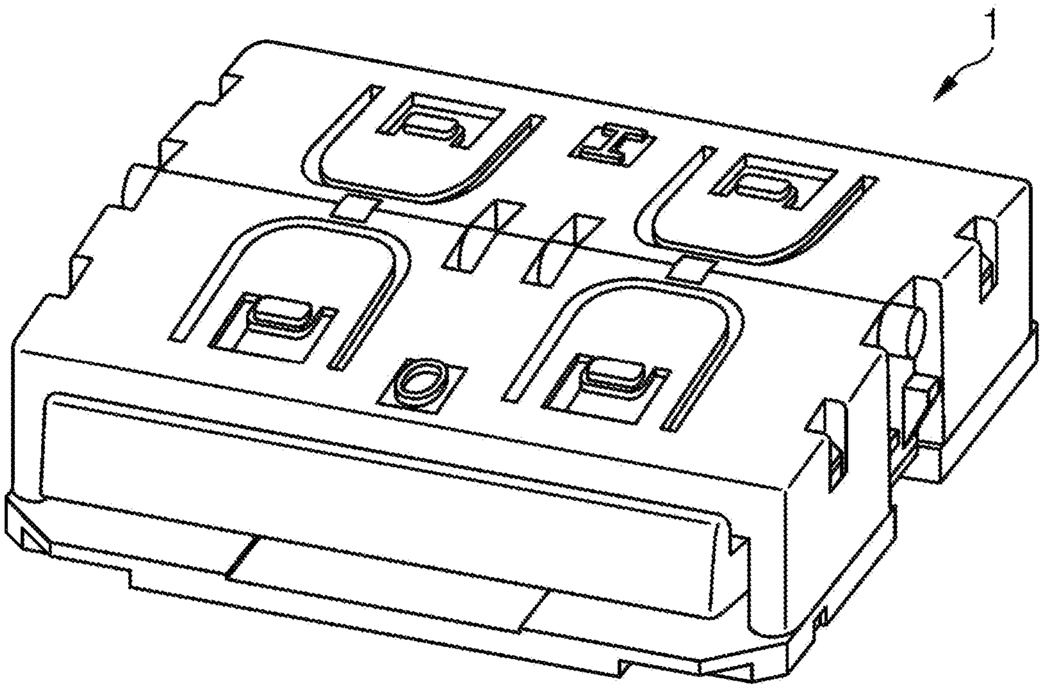
Figure 4:
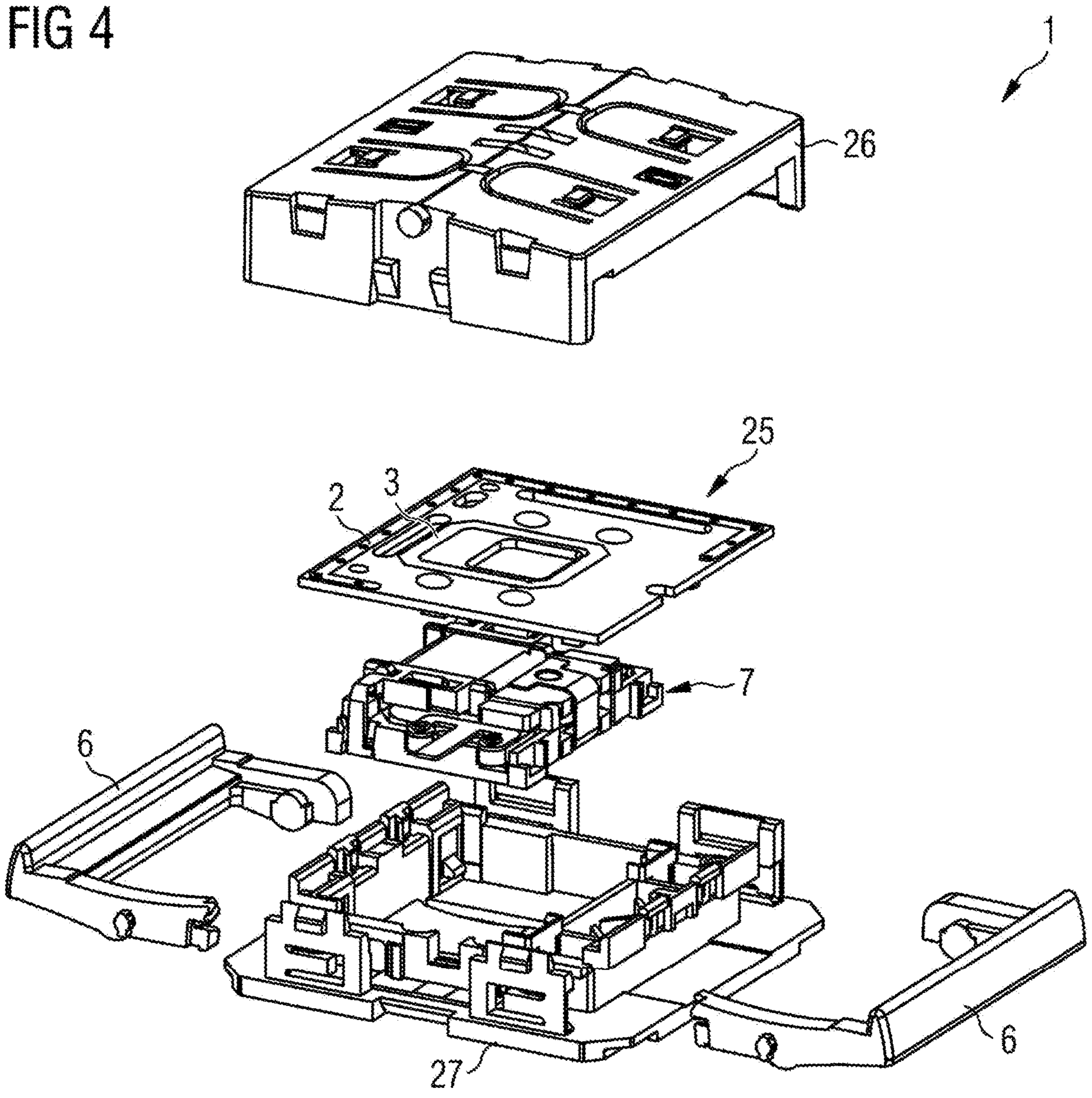
Figure 5:
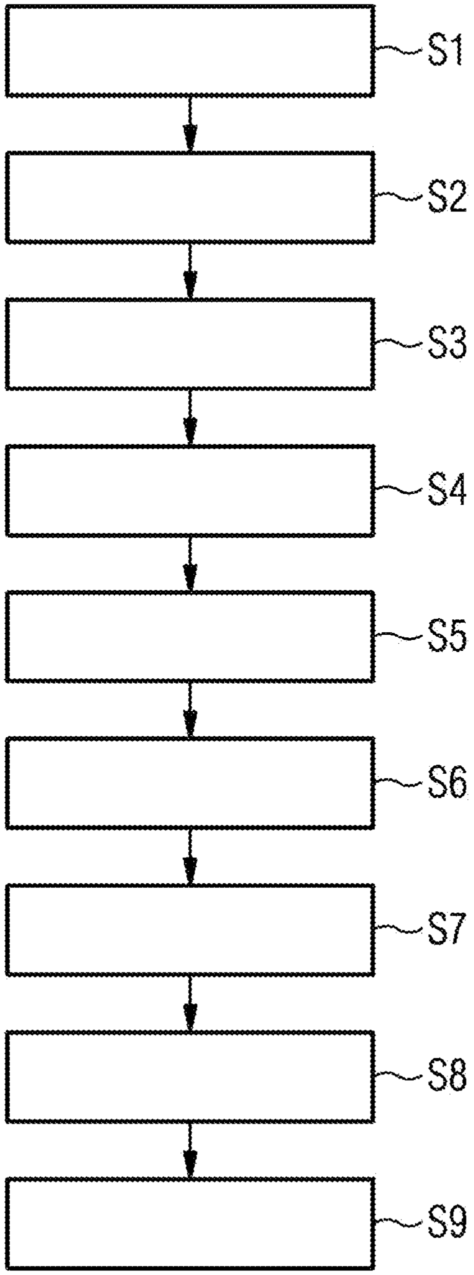

In the figures:

FIG. 1 a schematic representation of an embodiment of a remote switch and an external device, FIG. 2 a schematic representation of an embodiment of a system with a remote switch, an external device with online connection and several actuators, FIG. 3 a perspective view of a further embodiment of the remote switch, FIG. 4 an exploded view of the remote switch as shown in FIG. 3, and FIG. 5 a schematic representation of an implementation of a method for configuring a remote switch.

FIG. 1 shows a schematic representation of an embodiment of a remote switch 1 and an external device 12.

In this embodiment, the remote switch 1 is realized as an energy-autonomous remote switch 1. The remote switch 1 has an actuating element 6 for actuating the remote switch 1. The actuating element 6 is, for example, a rocker switch. Furthermore, the remote switch 1 has an energy converter 7 that is arranged to convert mechanical actuation energy of the actuating element 6 into electrical energy. The energy converter 7 is designed, for example, as a piezoelectric or electromagnetic converter. The electrical energy converted by the energy converter 7 is temporarily stored by means of an energy storage 8, wherein the remote switch 1 further comprises a voltage converter 9 for converting the electrical energy stored in the energy storage 8 into a defined operating voltage of the remote switch 1.

In this way, the remote switch 1 is energy-autonomous, with the electrical energy required for operation being provided from mechanical actuating energy of the actuating element 6. The remote switch 1 is thus flexible and mobile for use at different locations or in different application scenarios.

Furthermore, in the embodiment according to FIG. 1, the remote switch 1 has a microcontroller or a central processing unit 11 and a non-volatile memory 10. The non-volatile memory 10 stores, for example, data, in particular program data or software. This information is processed by the microcontroller 11. In general, the microcontroller 11 is configured to control the remote switch 1 for intended use.

In the embodiment according to FIG. 1, the remote switch 1 has two separate wireless interfaces 2 and 3. The first wireless interface 2 is a radio interface, whereby radio signals can be transmitted by the remote switch 1 via an antenna 4. Such radio signals are used, for example, to control one or more actuators that communicate with the remote switch 1 via a radio connection. Such communication takes place, for example, within a WLAN network.

The second wireless interface 3 is, for example, an NFC interface, wherein a wireless communication link can be established between the remote switch 1 and the external device 12 via the antenna 5, whereby information or data 19 and/or energy 20 is exchanged between the remote switch 1 and the external device 12.

The external device 12 has a corresponding wireless interface 14 with an antenna 16 for wireless communication with the remote switch 1, via which a corresponding wireless communication link can be established with the interface 3 (antenna 5) of the remote switch 1.

In the constellation according to FIG. 1, for example, a bidirectional exchange of information/data 19 takes place between the remote switch 1 and the external device 12 by means of the respective wireless interface 3 on the side of the remote switch 1 and the wireless interface 14 on the side of the external device 12. Furthermore, the external device 12 provides energy 20 to the remote switch 1 via this wireless connection. This energy supply is advantageous in enabling the remote switch 1 to operate independently of its own energy supply, as explained above, at least for configuration purposes. The energy 20 is transmitted from the external device 12 to the remote switch 1 via the respective wireless interfaces 3 and 14.

Moreover, the external device 12 further comprises a user interface 13, for example a touch-sensitive display, a battery 18 for supplying energy to the external device 12, a microcontroller or a central processing unit 28 for controlling the external device 12, and a further wireless interface 15 with an antenna 17 configured, for example, as a radio interface. In this way, the external device 12 can also be used in a mobile manner and can be integrated into any radio networks, for example into a WLAN. The external device 12 is, for example, a mobile device, such as a smartphone, tablet device or smartwatch.

FIG. 2 shows a schematic representation of an embodiment of a system with a remote switch 1, an external device

12 with online connection to an online service 21 as well as with several actuators 22, 23 and 24, which can be controlled via the remote switch 1. The remote switch 1 or the external device 12 according to the embodiment in FIG. 2 are set up, for example, according to the configuration of the embodiment of FIG. 1.

The actuators 22 and 23 in the implementation according to FIG. 2 are lights, for example, while the actuator 24 is a blind, for example. Each of the actuators 23, 23 and 24 have a corresponding transmitting/receiving device 22*a*, 23*a* and 24*a* and corresponding antennas 22*b*, 23*b* and 24*b* respectively. The remote switch 1 can communicate bidirectionally with the actuators 22, 23 and 24 via its radio interface 2 and antenna 4 (compare FIG. 1), in particular send control signals to the actuators 22, 23 and 24 or receive corresponding return signals (for example status signals) from the actuators 22, 23 and 24.

The external device 12 communicates with the remote switch 1, as has been explained in connection with FIG. 1, i.e. in particular via a wireless interface within the remote switch 1 (e.g. the interface 3 according to FIG. 1) and via a corresponding wireless interface in the external device 12 (e.g. the interface 14 according to FIG. 1). In the implementation in FIG. 2, the remote switch 1 and the external device 12 are configured to bidirectionally exchange information and data 19 via the respective wireless interfaces 3 and 14. Further, the external device 12 is configured to provide electrical energy 20 from the external device 12 to the remote switch 1 via the respective wireless interfaces 3 and 14.

The external device 12 is connected to the online service 21 via a separate wireless radio interface (e.g., the interface 15 shown in FIG. 1). The online service 21 is for example a service provided via a server for authentication of the external device 12 or the remote switch 1. Alternatively or additionally, the online service 21 is used to specify a range of functions or operating parameters or working parameters of the remote switch 1 or a permitted range of a configuration or maintenance of the remote switch 1, depending on which the remote switch 1 can be configured. For example, the online service 21 is set up to authorize or enable the permitted range of a configuration or maintenance of the remote switch 1 in the external device 12. A corresponding functionality or method for configuring the remote switch 1 by means of the external device 12 starting from the system as shown in FIG. 2 is explained in more detail in connection with a method according to FIG. 5 below.

In the system as shown in FIG. 2, the external device 12 is optionally equipped with a sensor system to collect additional information about the remote switch 1. Such additional information is, for example, identification information of the remote switch 1. The sensor system on the external device 12 is, for example, a camera of the external device 12. For example, a marker on the remote switch 1, for example a so-called QR code, is optically detected via the camera of the external device 12. This marker contains, for example, identification information of the remote switch 1, which can be processed accordingly after scanning of the marker by the external device 12. Optionally, detected identification information of the remote switch 1 can be sent to the online service 21 via the external device 12 to be checked or verified there.

Preferably, in the implementation according to FIG. 2 one or more communication links between the remote switch 1 and the actuators 22, 23 and 24, between the remote switch 1 and the external device 12 or between the external device 12 and the online service 21 are encrypted.

FIG. 3 shows a perspective view of a further embodiment of a remote switch 1 as it can be applied in FIGS. 1 and 2, for example. The form factor of the remote switch 1 according to FIG. 3 is selected in such a way that the remote switch 1 can be installed, for example, as a switch for surface mounting.

FIG. 4 shows an exploded view of the embodiment of the remote switch 1 according to FIG. 3, wherein individual components of the remote switch 1 are illustrated. In particular, the remote switch 1 according to FIG. 4 has an upper housing part 26 and a lower housing part 27. The upper housing part 26 comprises, in particular, four spring elements for actuating/triggering corresponding switching functions of the remote switch 1. One or more rocker switches for actuating the remote switch 1 are not shown in FIG. 4 for the sake of simplicity, but are mounted on the top of the upper housing part 26 when the remote switch 1 is installed to actuate the corresponding spring elements.

The lower housing part 27 serves to accommodate two actuating elements 6 and an energy converter 7 for converting mechanical energy of the actuating elements 6 into electrical energy, as explained in connection with FIG. 1 above. Furthermore, a circuit board 25 is mounted between the upper housing part 26 and the lower housing part 27, which comprises all electrical or electronic components of the switch 1 (apart from the energy converter 7). In particular, according to FIG. 4, the first wireless interface 2 is arranged on the circuit board 25, which is, for example, a radio interface analogous to the implementation in FIG. 1. Furthermore, the second wireless interface 3 is arranged on the circuit board 25 which is, for example, an NFC interface analogous to the implementation according to FIG. 1.

FIG. 5 shows a schematic representation of an implementation of a method for configuring a remote switch with several method steps S1 to S9. In the following, such a method for configuring the remote switch 1 in a system according to the exemplary embodiment shown in FIG. 2 is explained in more detail. All subsequent explanations structurally refer to the exemplary implementation of FIG. 2, with various method steps of a method being explained in various exemplary implementations according to FIG. 5.

As explained above, the external device 12 is battery-operated (battery 18) with user interface 13 and enables bidirectional communication 19 with the remote switch 1 and energy transmission 20 to the remote switch 1. The communication link between the external device 12 and the remote switch 1 is established via the wireless interfaces 3 and 14 (see FIG. 1) with a short range, typically up to a few meters. The external device 12 has access to the online service 21 to exchange data and/or permissions/authorizations to perform actions related to a configuration of the remote switch 1 with the online service 21 when in use or time-deferred. A communication link between the remote switch 1 and the external device 12 or between the external device 12 and the online service 21 is preferably established by means of secured (encrypted) communication.

1) Exemplary implementation of a method according to FIG. 5 for the configuration procedure of functions of the remote switch 1 according to FIG. 2.

In a step S1, a set of predefined functions of the remote switch 1 is selected. In an optional step S2, a release (rights to make this change) is obtained for this purpose via the connection to the online service 21, either by obtaining a release for the individual remote switch 1 (e.g. via identification information of the remote switch 1 detected by the device 12), or a limited-use release for all remote switches of a type, e. g. "remote switch with properties xyz". For example, an account linked to the external device 12 is checked in the online service 21 as to whether the corresponding rights have been activated or acquired, e.g. whether a certain range of functions or certain configurations of the remote switch 1 have been enabled, e.g. by purchase.

In a further step S3, the device 12 is brought in proximity to the remote switch 1. In a step S4 the wireless interface (interface 14 according to FIG. 1) of the device 12 supplies electrical energy to the remote switch 1. In a step S5, a communication link is initiated between the wireless interface of the device 12 and the wireless interface (interface 3 according to FIG. 1) of the remote switch 1.

In a step S6, the transmission of the set of predefined functions to the remote switch 1 is initiated manually or automatically. As soon as the set of predefined functions has been transmitted to the remote switch 1, in step S7 the configuration of the functions of the remote switch 1 is performed based on the set of predefined functions.

In an optional step S8, after completion of the configuration of the remote switch 1, which is communicated to the device 12, for example, via a corresponding return signal from the remote switch 1, the set configuration of the remote switch 1 is checked by the device 12. This is done, for example, by sending test data from the device 12 to the remote switch 1.

In an optional final step S9, after the configuration of the remote switch 1 has been completed, this configuration is stored in the device 12 and/or in the online service 21 and is clearly assignable (e.g. via an identification number of the remote switch 1).

2) Exemplary implementation of a method according to FIG. 5 for the procedure for assigning the remote switch 1 to one or more actuators 22, 23 or 24 in the system according to FIG. 2.

In a step S1, the device 12 is brought in proximity to the remote switch 1. In a step S2 the wireless interface (interface 14 according to FIG. 1) of the device 12 supplies the remote switch 1 with electrical energy. In a step S3, a communication link is initiated between the wireless interface of the device 12 and the wireless interface (interface 3 as shown in FIG. 1) of the remote switch 1.

In a step S4, identification information of the remote switch 1 is interrogated via its wireless interface (see interface 3 of FIG. 1). Alternatively or additionally a QR code of the remote switch 1 is read, which is interrogated by a camera of the device 12.

Preferably, the device 12 has information as to which of the actuators 22, 23 or 24 is to be assigned to the remote switch (one or more actuators). In a step S5, a defined range of functions and/or defined operating parameters are optionally specified by means of the external device 12, which allow a defined control of one or more of the actuators 22, 23 or 24 by the remote switch 1. Thereby, optionally, the defined range of functions and/or the defined operating parameters are configured in the remote switch 1. The defined range of functions and/or the defined operating parameters are predefined, for example, analogously to the 1) exemplary embodiment by the online service 21.

In a further step S6, the remote switch 1 is optionally initiated to transmit a radio signal to the actuator or actuators 22, 23, and/or 24 with the energy 20 supplied via the interface.

In a further step S7, the remote switch 1 is optionally switched to a receive mode to receive a return acknowledgement (return signal, acknowledge signal) of the reception of its radio signal transmitted in step S6 by the actuator(s) 22, 23, and/or 24. This acknowledgement is qualitatively evaluated according to signal strength and correctness, e.g. by means of identifiers (identification information) of the actuators 22, 23 and/or 24. This determines whether the correct actuators 22, 23 or 24 are being controlled with the desired functionality.

Steps S6 and S7 can also be performed iteratively for a plurality of the actuators 22, 23 or 24.

In an optional step S8, status information is transmitted depending on the received acknowledgement(s) from the remote switch 1 to the external device 12 by means of the communication link, and the transmitted status information is evaluated by the external device 12.

In a final step S9, after successful communication between the remote switch 1 and a corresponding actuator 22, 23 or 24, this pairing is permanently stored, preferably in the respective actuators 22, 23 or 24, optionally also in the remote switch 1 and/or in the external device 12 and/or in the online service 21. Thus, an assignment has been fixed and optionally also the quality of the radio link has been checked.

The advantage of these measures is that there is no need for the device 12 to access a radio network or a radio connection between the remote switch 1 and the actuators 22, 23, 24 in order to assign and check a pairing between the remote switch 1 and one or more of the actuators 22, 23 or 24. Rather, information is exchanged thereon between the remote switch 1 and the device 12 via the wireless communication link between these components of the system. In this way the system can be configured or maintained without having to grant a user of the device 12 access to the radio network or to a radio connection between the remote switch 1 and the actuators 22, 23, 24. This increases the level of security.

3) Exemplary embodiment of a method according to FIG. 5 for troubleshooting, maintenance or quality assurance in the system with the remote switch 1 and the actuators 22, 23, 24 according to FIG. 2.

In the case of a malfunction of the remote switch 1 or one or more of the actuators 22, 23, 24 a comprehensive diagnosis can be easily performed with the mobile device 12.

In a step S1, the device 12 is brought in proximity to the remote switch 1. In a step S2, the wireless interface (interface 14 according to FIG. 1) of the device 12 supplies the remote switch 1 with electrical energy. In a step S3, a communication link is initiated between the wireless interface of the device 12 and the wireless interface (interface 3 according to FIG. 1) of the remote switch 1.

In a step S4, the sending of a radio telegram out of the remote switch 1 to one or more of the actuators 22, 23, 24 is initialized by the device 12. In a step S5, a reaction of the one or more actuators 22, 23, 24 is checked.

In a step S6, a switching of the remote switch 1 to the receive mode and an evaluation of acknowledge signals of the one or more actuators 22, 23, 24 is performed. In a step S7, a readout of the history of the radio connection between the remote switch 1 and the one or more actuators 22, 23, 24 by means of the wireless communication link is performed by the device 12, and optionally an evaluation of the readout information is performed. Optionally, a readout of an error memory of the remote switch 1 is performed by the device 12 and optionally an evaluation of this readout information is performed.

In an optional further step S8, error elimination measures are initiated and performed, e.g. by means of a software update or a reconfiguration of the remote switch 1 by the device 12 in accordance with the measures explained above.

In a final optional step S9, a recommendation of other repair measures is made by the device 12, e.g. hardware replacement of the remote switch 1.

All embodiments and/or implementations described are selected merely by way of example.

LIST OF REFERENCE SIGNS

1 remote switch
2 first wireless interface
3 second wireless interface
4 antenna
5 antenna
6 actuating element
7 energy converter
8 energy storage
9 voltage transformer
10 non-volatile memory
11 microcontroller, central processing unit
12 external device
13 user interface
14 first wireless interface
15 second wireless interface
16 antenna
17 antenna
18 battery
19 information, data
20 energy
21 online service
22 actuator
23 actuator
24 actuator
22*a* transmitting/receiving device
23*a* transmitting/receiving device
24*a* transceiver
22*b* antenna
23*b* antenna
24*b* antenna
25 circuit board
26 upper housing part
27 lower housing part
28 microcontroller, central processing unit
S1 to S9 method steps

The invention claimed is:

1. A remote switch comprising:

a first wireless interface for sending switch commands to one or more actuators;

a second wireless interface arranged separately from the first wireless interface and configured for wirelessly transmitting information (i) from an external device to the remote switch and/or (ii) from the remote switch to the external device, wherein the second wireless interface is further configured for wirelessly transmitting energy from the external device to the remote switch during configuration or maintenance of the remote switch by the external device, wherein the energy is used (i) for operating the remote switch and (ii) for initiating and transmitting a radio signal to the one or more actuators via the first wireless interface, and wherein the remote switch is configured to (i) receive one or more return signals, the one or more return signals including status information as link quality of a radio connection from the one or more actuators and (ii) send the one or more return signals to the external device via the second wireless interface;

a housing having an upper housing part and a lower housing part;

at least one actuating element provided in the lower housing part;

an energy converter provided in the lower housing part, the energy converter coupled to the at least one actuating element, the energy converter receiving mechanical energy from the at least one actuating element and providing electrical energy from the received mechanical energy, the provided electrical energy used to operating the remote switch; and a circuit board mounted between the upper housing part and the lower housing part, the circuit board including the first wireless interface and the second wireless interface.

2. A remote switch according to claim 1, wherein the second wireless interface is configured as a bidirectional data interface for wireless exchange of information between the remote switch and the external device.

3. A remote switch according to claim 1, wherein the second wireless interface is configured as follows:

as an inductive interface, in particular for near-field communication and/or as a radio interface and/or as an optical interface and/or as a capacitive interface.

4. A remote switch according to claim 1, wherein the remote switch comprises an energy converter for converting ambient energy into electrical energy for operating the remote switch.

5. A remote switch according to claim 1, wherein the remote switch can be configured or maintained via the second wireless interface in such a way that a range of functions of the remote switch and/or operating parameters of the remote switch are influenced by one or more of the following measures:

activation, deactivation, readout, modification.

6. The method according to claim 1, wherein the energy converter is a piezoelectric converter or an electromagnetic converter.

7. A method of communication between a remote switch and an external device, comprising:

transferring energy from the external device to the remote switch during configuration or maintenance of the remote switch by the external device by use of a second wireless interface of the remote switch, wherein the energy is used for operating the remote switch;

creating a communication link between the second wireless interface of the remote switch and a wireless interface of the external device, wherein the second wireless interface of the remote switch is arranged separately from a first wireless interface of the remote switch for sending switch commands;

transmitting information (i) from the external device to the remote switch, and/or (ii) from the remote switch to the external device by the established communication link;

initiating and transmitting a radio signal from the remote switch to one or more actuators via the first wireless interface of the remote switch by using the energy transmitted from the external device to the remote switch;

receiving, by the remote switch, one or more return signals from the one or more actuators, the one or more return signals containing status information as link quality of a radio connection from the one or more actuators;

sending, by the remote switch, the one or more return signals to the external device via the communication link;

receiving, by an energy converter of the remote switch, mechanical energy from at least one actuating element of the remote switch; and providing, by the energy converter, electrical energy for operating the remote switch, wherein the electrical energy is provided to a circuit board including the first wireless interface and the second wireless interface.

8. The method according to claim 7, further comprising:

configuring or maintaining the remote switch by the external device depending on the transmitted information, wherein a range of functions of the remote switch and/or operating parameters of the remote switch are influenced by one or more of the following measures:

activation, deactivation, readout, modification.

9. The method according to claim 8, wherein the external device is connected to an online service and obtains a release to configure or maintain the remote switch at the online service, wherein the configuration or maintenance of the remote switch by the external device can only be performed if the release has been obtained at the online service.

10. The method according to claim 9, wherein the online service specifies a certain range for configuring or maintaining the remote switch and the range for configuring or maintaining the remote switch is authorized in the external device via the obtained release.

11. The method according to claim 7, further comprising:

storing a pairing of the remote switch with the one or more actuators.

12. The method according to claim 7, wherein information is exchanged between the remote switch and the external device bidirectionally via the communication link.

13. The method according to claim 12, further comprising:

transmitting, by the remote switch, status information depending on the received return signal(s) from the remote switch to the external device by use of the communication link; and evaluating the transmitted status information by the external device.

14. An arrangement configured to perform a method according to claim 7, the arrangement comprising a remote switch and an external device.

15. The remote switch according to claim 1, wherein the energy converter is a piezoelectric converter or an electromagnetic converter.

* * * * *